United States Patent [19]

Bollier et al.

[11] Patent Number: 5,019,689

[45] Date of Patent: May 28, 1991

[54] ANNULAR FURNACES WITH A ROTARY HEARTH FOR SHAPING ONE OF THE FACES OF BLANKS OF OPTICAL LENSES TO A DESIRED PROFILE BY HEAT SAGGING AND APPLICATION OF A VACUUM

[75] Inventors: Jean F. Bollier, Avignon; Jean-Jacques Boumendil, La Colle Sur Loum, both of France

[73] Assignee: Piezo-Ceram Electronique, Antibes, France

[21] Appl. No.: 424,506

[22] Filed: Oct. 20, 1989

[51] Int. Cl.⁵ ............................................. F27D 11/06
[52] U.S. Cl. .................................... 219/388; 432/138; 432/124
[58] Field of Search .................. 219/388, 389; 266/87, 266/97, 251; 432/34, 138, 238, 79, 122, 124, 239; 373/3, 4, 7, 17, 141, 61

[56] References Cited

U.S. PATENT DOCUMENTS

| | | | |
|---|---|---|---|
| 2,074,662 | 3/1937 | McLay | 432/138 |
| 2,924,695 | 2/1960 | Atkeson | 219/388 |
| 3,248,517 | 4/1966 | Vranken | 219/388 |
| 4,412,813 | 11/1983 | Wulf | 432/239 |

Primary Examiner—Bruce A. Reynolds
Assistant Examiner—Tuan Vinh To
Attorney, Agent, or Firm—Breiner & Breiner

[57] ABSTRACT

The invention relates to a continuous furnace for shaping one of the faces of blanks of optical lenses to a desired profile by heat sagging of the blanks on suitably profiled jigs with the concomitant action of a vacuum. The continuous furnace includes a stationary frame, an annular rotary hearth formed from a plurality of successive sections with each section being provided with a plurality of tulip-shaped supports intended to support the jigs, a stationary tunnel having at least one zone for heating the blanks at a temperature which causes them to soften and at least one zone for cooling the blanks which have one of their faces shaped, a motor for driving the hearth in rotation, a vacuum source driven in rotation with the hearth, and a suitable device for connecting the tulip-shaped supports of a given section of the hearth to the vacuum source when this section reaches a first predetermined position in the heating zone and for connecting the tulip-shaped supports to ambient air when the section reaches a second predetermined position in the heating zone. The furnace of the invention is useful in the manufacture of graded-index lenses.

2 Claims, 3 Drawing Sheets

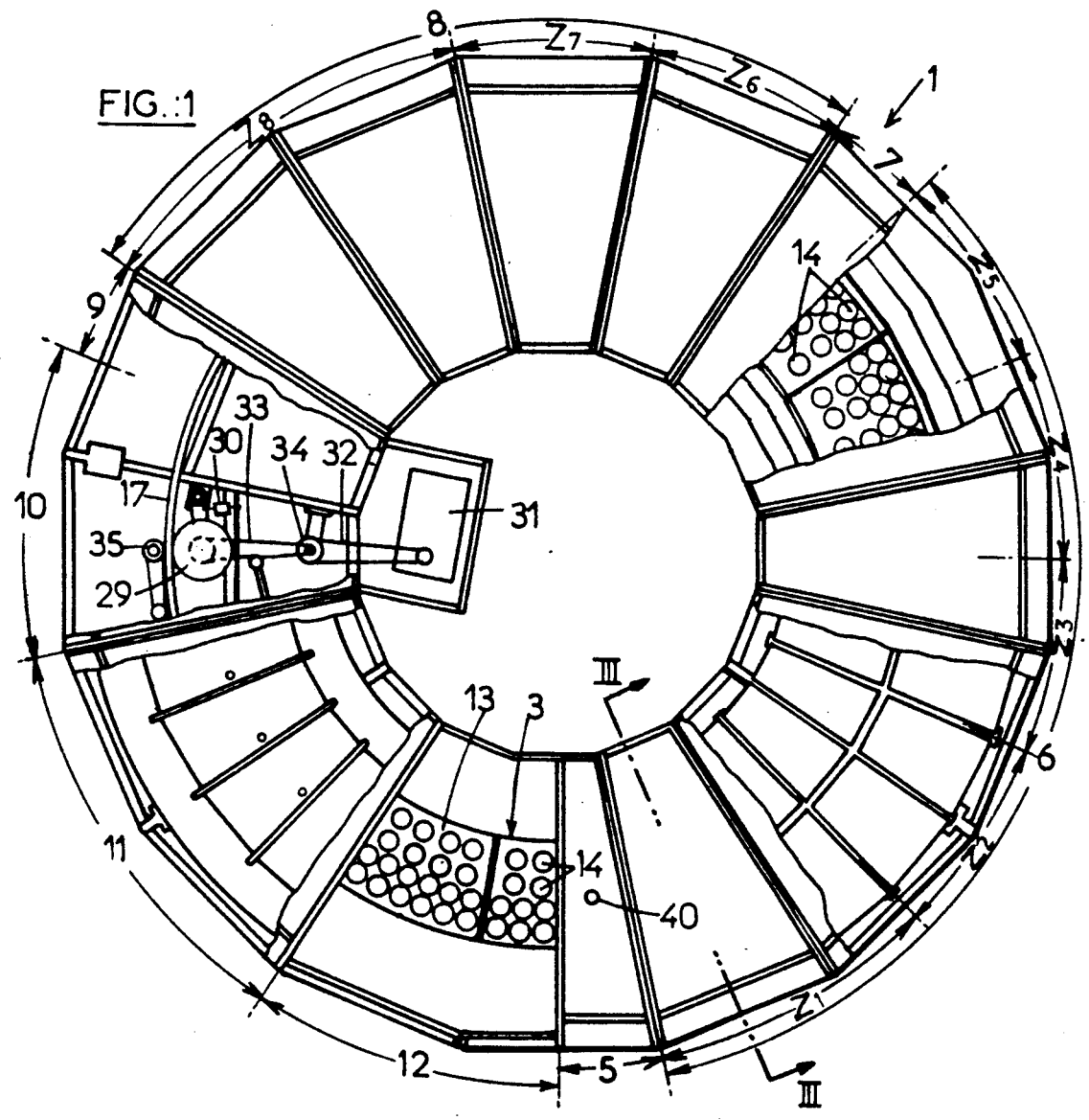
FIG.:1
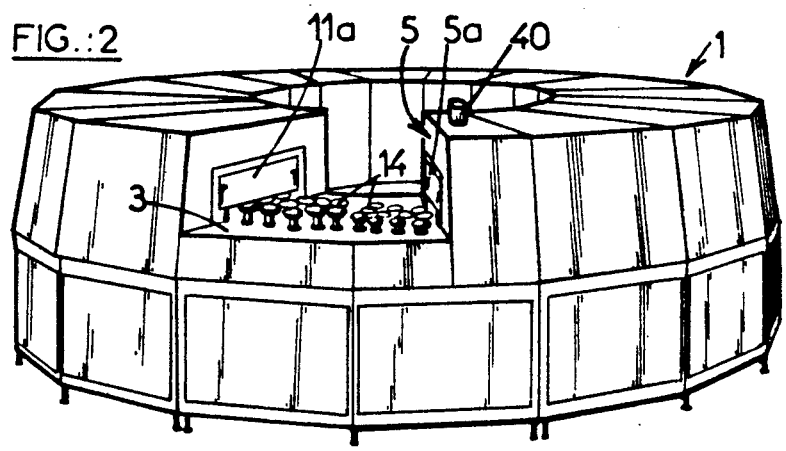
FIG.:2

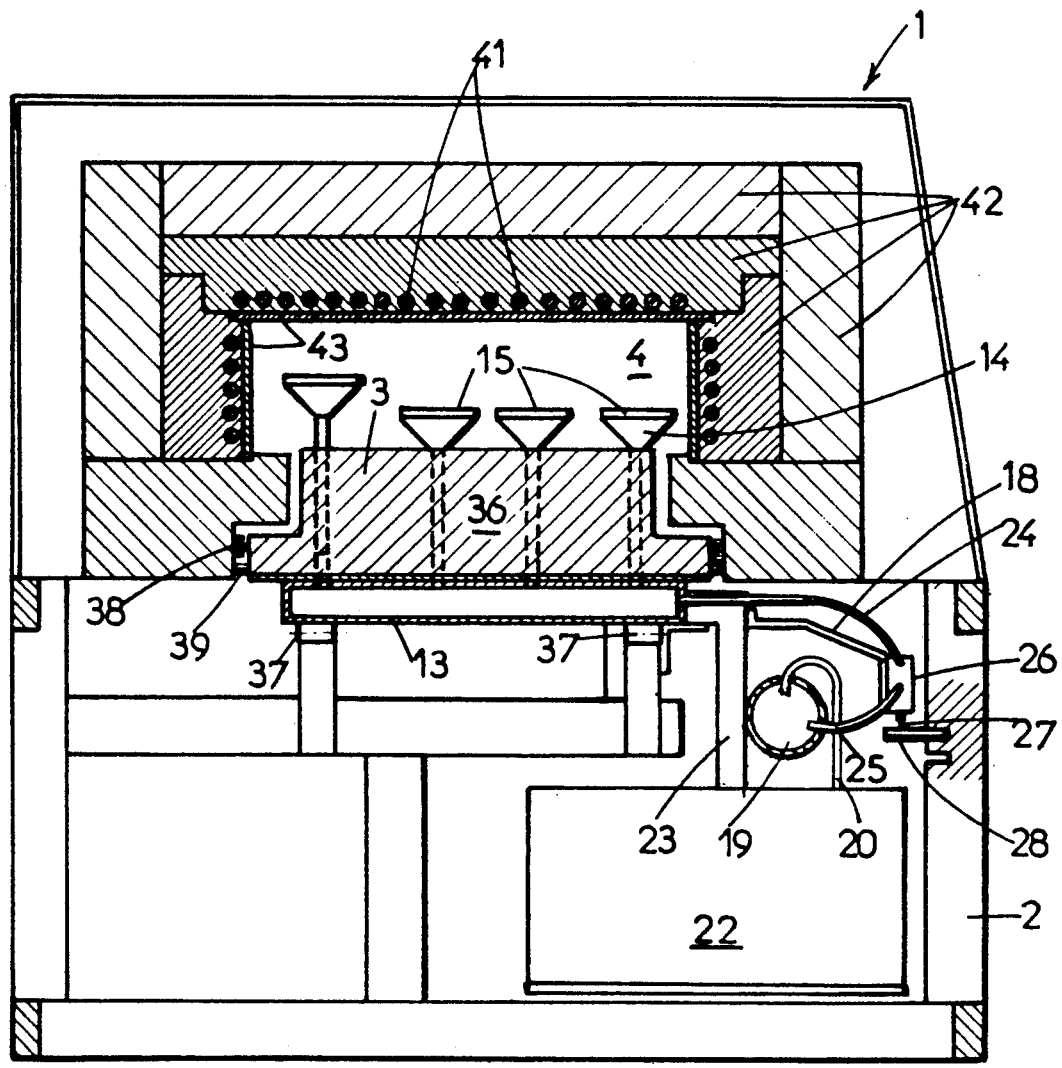
FIG.:3

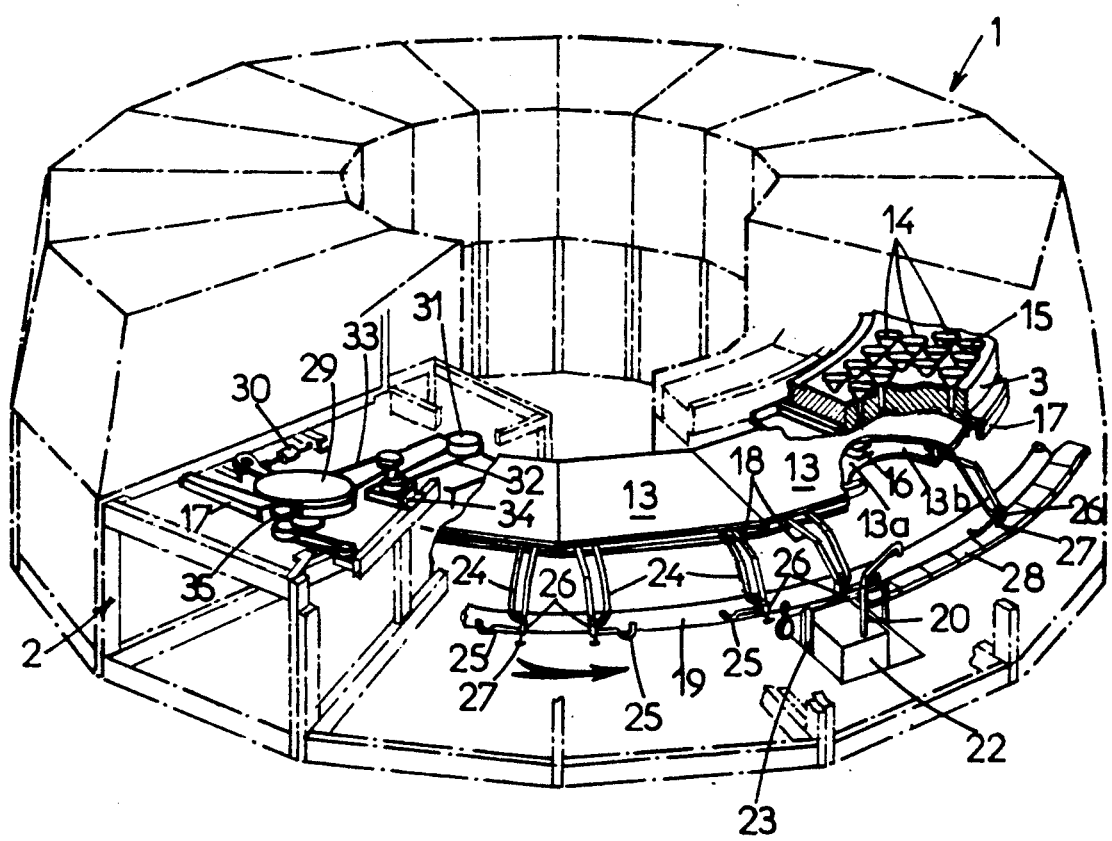
FIG.:4

ANNULAR FURNACES WITH A ROTARY HEARTH FOR SHAPING ONE OF THE FACES OF BLANKS OF OPTICAL LENSES TO A DESIRED PROFILE BY HEAT SAGGING AND APPLICATION OF A VACUUM

The invention relates to a continuous furnace with a rotary hearth for shaping one of the faces of blanks of optical lenses to a desired profile by heat sagging and application of a vacuum.

It is known to produce blanks of optical lenses, in particular of graded-index lenses, by heat sagging and application of a vacuum to the lower part of blanks which are passed through a shaping furnace at a sufficient temperature, these blanks being arranged on suitably profiled porous jigs which themselves rest on supports, termed "tulips", connected to a vacuum source. In this way blanks of optical lenses are obtained having one of their faces suitably profiled.

The types of furnace which are currently available for the shaping of one of the faces of blanks of optical lenses are all furnaces which operate discontinuously, because up until now it has been impossible to produce a furnace capable of operating continuously because of the problems posed by applying the vacuum.

However, it would be desirable, in order to improve the productivity and reduce manufacturing costs of the blanks of lenses, to make use of an apparatus capable of operating continuously.

The aim of the present invention is to overcome this problem.

The object of the invention is therefore to provide a continuous furnace for shaping one of the faces of blanks of optical lenses to a desired profile by heat sagging of these blanks on suitably profiled jigs with the concomitant action of a vacuum.

More particularly, the invention relates to a continuous furnace for shaping one of the faces of blanks of optical lenses to a desired profile by heat sagging of these blanks on suitably profiled jigs with the concomitant action of a vacuum, which comprises:

a stationary frame, a rotary hearth with a generally annular shape formed from a plurality of successive sections, each section being provided with a plurality of supports, which are in the shape of tulips, intended to support the jigs, a stationary tunnel which covers the hearth for a part of its length and comprises at least one zone for heating the blanks at a temperature which causes them to soften and at least one zone for cooling the blanks which have one of their faces shaped, the part of the hearth which is not covered by the tunnel forming stations for loading the furnace with blanks to be shaped and for unloading the blanks which have one of their faces shaped, means for driving the hearth in rotation, a vacuum source driven in rotation with the hearth, and means allowing the tulip-shaped supports of one section of the hearth to be connected to the vacuum source when this section attains a first predetermined position in the heating zone, and the said tulip-shaped supports then to be connected to the ambient air when the said section attains a second predetermined position in the heating zone.

According to a particular embodiment, the means allowing the tulip-shaped supports of one section of the hearth to be connected to the vacuum source when this section attains a first predetermined position in the heating zone, and the said tulip-shaped supports then to be connected to the ambient air when the said section attains a second predetermined portion of the heating zone comprise a line equipped with a distributing device which allows the tulip-shaped supports to be connected either to the vacuum source or to the ambient air, means for controlling the said distributing device and means which form a cam for actuating these control means; and the vacuum source comprises a vacuum pump and a vacuum tank.

The description which follows, made with reference to the attached drawings, will allow the invention to be readily understood.

FIG. 1 is a top view, with cutaways, of furnace according to the invention.

FIG. 2 is a perspective view showing the unloading-loading stations of the furnace in FIG. 1.

FIG. 3 is a cross-sectional view along the line III—III in FIG. 1, and

FIG. 4 is a cutaway perspective view illustrating more particularly the system for placing the tulip-shaped supports of this furnace under vacuum.

In FIGS. 1-4 there is shown a continuous annular furnace according to the invention, designated by the general reference 1, which comprises a stationary frame 2, a rotary annular hearth 3, and a stationary tunnel 4 which covers the hearth over a large part of its circumference, this tunnel comprising an entrance section 5 which is equipped with a flap 5a limiting the passage of air, a first heating zone 6, a zone of relief from heating 7, a second heating zone 8, a dead zone 9, an air-jacket cooling zone 10, and a water-jacket cooling zone 11 and comprising at its exit a flap 11a limiting the passage of air. The part of the hearth which is not covered by the tunnel forms a station 12 for unloading-loading the furnace.

The hearth 3 is formed, for example, from 16 adjacent leakproof metal chambers 13 upon each of which are mounted, for example, 20 tulip-shaped hollow supports 14, for example made of heat-resistant steel, which are connected with the inside of the chamber which supports them and are intended to accommodate profiled jigs, such as 15, upon which the blanks of optical lenses to treated will be arranged Each chamber is divided internally into two leakproof half-chambers 13a and 13b by a stiffening beam, such as 16.

The hearth 3 is equipped with a vertical lateral rail 17 which acts as a roller track and serves to drive the hearth in rotation, as explained below.

A tube 19 is attached to the hearth 3 by arms 18 and acts as a vacuum tank which is itself connected, via line 20, to a vane-type vacuum pump 22 which—supported by a cradle 23 fastened to the said tube 19. Each half-chamber of the hearth is in turn connected to the tube 19 by lines 24 and 25, via a pneumatic distributing device 26 which is actuated by a wheel sensor 27 allowing the half-chamber to be connected, depending on whether the sensor 27 is in the low or high position, to either the ambient air or the tube 19 which acts as a vacuum tank, respectively. For this purpose, a rail 28, which extends substantially parallel to the tube 19 and acts as a cam for the wheel of the sensor, is provided along the heating zone of the furnace. When the wheel of the sensor reaches the rail, it is raised and causes the corresponding half-chamber to be connected to the vacuum tank tube. When the wheel of the sensor leaves the rail, it is lowered and connects the corresponding half-chamber to the ambient air, causing the vacuum in the said half-chamber to be broken. The rail 28 is formed from a plurality of sections whose height is individually adjustable so as to be able to adjust the length of the part of the heating zone in which it is desired to apply a vacuum to the tulip-shaped supports The driving of the hearth in rotation is effected by a rubber roller 29 which has a large diameter, is held in contact against the rail 17 by a jack 30 and is driven in rotation by an electric motor 31 by belts 32 and 33 via a reducing unit 34. A roller 35 situated opposite the roller 29 and arranged on the other side of the hearth prevents the rail 17 from becoming deformed under the pressure exerted by the roller 29 and, therefore, any untoward slipping.

The tulip-shaped supports 14 are mounted with slight friction in a base 36 (for example made of heat-resistant steel) which is supported by the chambers so as to make it possible to adjust their height to a certain degree.

The hearth rests on the frame by means of loose-fitting rollers 37 allowing it to rotate.

Baffles 38 and a seal 39 of the rubbing brush type ensure a degree of sealing between the rotary hearth and the frame with the intention of avoiding or minimizing draughts in the furnace, as well as the entry of dust particles into the furnace.

The upper part of the furnace is formed by the tunnel 4. This tunnel has an entrance 5 which is provided with a chimney with an adjustable opening 40, a first heating zone 6 which is divided, for example, into five sections $Z_1$, $Z_2$, $Z_3$, $Z_4$ and $Z_5$, a zone of relief from heating 7, a second heating zone 8 which is divided, for example, into three sections $Z_6$, $Z_7$ and $Z_8$, a dead zone (with no heating elements) 9, an air-jacket cooling zone 10, and a water-jacket cooling zone 11. The tunnel is interrupted between the cooling zone 11 and the entrance 5 so as to allow the hearth to be unloaded of shaped blanks and to be loaded with blanks to be treated.

The zones 6, 7 and 8 of the tunnel comprise heating resistors 41 (for example made of Khantal DSD alloy) which are arranged between heat-insulating layers 42 (for example formed from panels of insulating ceramic fibers) and an inner coating 43 lining the crown and the side walls of the tunnel, which is formed, for example, from plates of silicon carbide, which allows the pollution of the atmosphere prevailing in the furnace to be minimized and contributes to the homogeneity of the heating. Thermocouples (not shown) connected to a control system allow a predetermined reference temperature to be maintained in each of the sections $Z_1$ to $Z_8$.

The cooling zones 10 and 11 make use of jackets with compressed air and water running through them.

Some specifications of a typical furnace of the invention are indicated below for information:
outer radius: 2250 mm
width of the hearth: 520 mm
total number of tulip-shaped supports: 320
diameter of a tulip-shaped support: 90 mm
number of tulip-shaped supports inside the tunnel: 290
productivity: 1740 shaped blanks a day.

HEAT CYCLE

Duration: 4 Hours

|  | value of angle of rotation | residence time, minutes | temperature, °C. |
|---|---|---|---|
| Entrance 1st heating zone | 11° 25 | 7.5 |  |
| $Z_1$ | 33°75 | 22.5 | 530 |
| $Z_2$ | 22°50 | 15 | 700 |
| $Z_3$ | 22°50 | 15 | 750 |
| $Z_4$ | 22°50 | 15 | 710 |
| $Z_5$ | 22°50 | 15 | 715 |
| Relief from heating | 11°25 | 7.5 | 520 |
| 2nd heating zone |  |  |  |
| $Z_6$ | 22°50 | 15 | 500 |
| $Z_7$ | 22°50 | 15 | 450 |
| $Z_8$ | 45° | 30 | 375 |
| Cooling | 90° | 60 |  |

Application of the vacuum: between the start of the zone $Z_3$ and the end of the relief from heating.

Value of the vacuum applied: 150 millibars of absolute pressure.

The temperature profile of the heat cycle, the duration of the heat cycle, as well as the various abovementioned characteristics of the furnace are, of course, only examples which can be modified depending on particular requirements.

Likewise, although the furnace of the invention has been designed for the treatment of glass blanks, it could also serve for producing glass molds used for manufacturing organic lenses.

We claim:

1. A continuous furnace for shaping one of the faces of blanks of optical lenses to a desired profile by heat sagging of these blanks on suitably profiled jigs with the concomitant action of a vacuum, which comprises a stationary frame, an annular rotary hearth formed from a plurality of successive sections, each section being provided with a plurality of tulip-shaped supports, a stationary tunnel having at least one zone for heating the blanks at a temperature which causes them to soften and at least one zone for cooling the blanks which have one of their faces shaped, a motor for driving the hearth in rotation, a vacuum source driven in rotation with the hearth, means for connecting the tulip-shaped supports of a given section of said rotary hearth to the vacuum source when this section reaches a first predetermined position in the heating zone and for connecting said tulip-shaped supports of said given section to ambient air when said given section reaches a second predetermined position in the heating zone.

2. A furnace as claimed in claim 1, wherein the means for connecting the tulip-shaped supports of said given section of the hearth to the vacuum source when said section reaches a first predetermined position in the heating zone, and for connecting said tulip-shaped supports to the ambient air when said section reaches a second predetermined position in the heating zone comprises a line equipped with a distributing device which allows the tulip-shaped supports to be connected either to the vacuum source or to the ambient air, means for controlling said distributing device and means which form a cam for actuating these control means; and the vacuum source comprises a vacuum pump and a vacuum tank.

* * * * *